Sept. 17, 1963     C. E. NEWKIRK     3,104,123

ADJUSTABLE SECURING MEANS

Filed Feb. 12, 1962     2 Sheets-Sheet 1

INVENTOR.
Clarence E. Newkirk.
BY
George Douglas Jones
ATTORNEY

# United States Patent Office 3,104,123
Patented Sept. 17, 1963

3,104,123
ADJUSTABLE SECURING MEANS
Clarence E. Newkirk, 227 N. Emily St., Anaheim, Calif.
Filed Feb. 12, 1962, Ser. No. 172,686
1 Claim. (Cl. 287—54)

This invention relates to improvements in adjustable securing or locking means and more particularly to adjustable securing means adapted to agricultural and industrial equipment.

Implements, such as disc harrows, plows, scrapers, hillers, scarifiers and other earth working implements require constant adjustments to meet the varying soil conditions or ground conditions.

It is a primary object of the present invention to provide a simple, inexpensive adjustable locking means that may be built into the implement supporting or carrying frame-work that will permit of a plurality of large, small or extremely large angular adjustments and after setting the desired angle, securing the frames in rigid relationship.

A further object of the invention is to provide the adjustable and locking means wherein telescoping members may be positioned in predetermined relationship and rigidly secured in the desired working positions.

In accomplishing these and other objects of the present invention I have provided improved details of structure, the preferred form of which is illustrated in the accompanying drawings, wherein.

Figure 1:
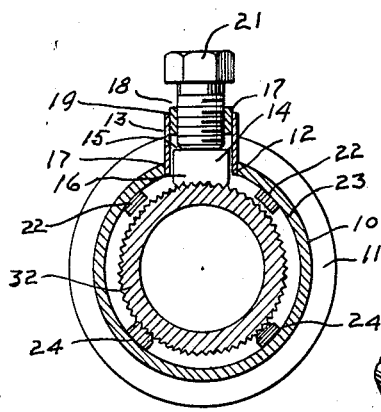
FIGURE 1 is a sectional view of the structure illustrating the outer and inner tube members in operating relationship.

Referring more in detail to the drawings by numerals of reference wherein like numerals refer to like parts, the numeral 10 designates an outer tube member, best illustrated in FIGURE 1 of the drawings and an outer reinforcing member 11 secured to and adjacent the end of the said outer tube to insure rigidity of the said tube member 10 and to reinforce the wall thereof; the opening 12 in the wall of the said outer tube 10 is preferably square in cross section and an upstanding member 13 is preferably positioned within the said opening 12, the said member being square in cross section and hollow and rigidly secured therein by any suitable securing means such as welding, brazing or the like. The object of providing the said member 13 with square cross section and hollow is to permit the insertion therein of a slidable member 14 having a flush upper surface 15 and a serrated lower surface 16.

A cap portion 17, having a screw threaded aperture 18 centrally therethrough, the said cap being rigidly secured to the upper inner portion 19 of the said member 13. A screw threaded member 21 is positioned in screw threaded relationship within the said screw threaded aperture 18; the purpose of which will become more apparent as the description progresses.

Positioned adjacent and on each side of the opening 12 and on the inner wall 23 of the outer tube member 10 and rigidly secured thereto are positioned spacer bars 22, and in oppositely opposed relation to the said spacer bars 22 and rigidly secured to the inner wall 23 of the outer tube 10, a plurality of serrated faced securing blocks 24 are positioned in spaced apart relation.

The external opening 25 of the outer tube member 10 is provided with a cap member 26, preferably rigidly secured thereto and having an aperture 27 centrally therethrough and into which is positioned a screw threaded member 28 and provided with a washer 29.

The inner tube member 31 is provided with a serrated inserting end 32 the said end being closed by means of cap 33 or similar means with a centrally positioned screw threaded aperture 34 therethrough, the said inserting end 32 is positioned within the outer tube member 10 and rotatably retained therein by means of member 28 being screwthreaded into the said screwthreaded aperture 34.

In this manner the two members, outer member 10 and inner member 31 having its serrated end 32 positioned in the said outer member 10 and in abutting relation with spacer bars 22 and serrated faced securing blocks 24, and thereafter upon setting the desired adjustment the screw threaded member 28 cinches the two members 10 and 31 in internal abutting relation, whereupon the screw threaded member 21 is caused to force the slidable member 14 into intimate contact with the serrated surface 32 of the inner tube 31 and simultaneously into abutting relation with the serrated securing blocks 24, thus forming a complete unitary structure.

When adjustment of the earth working tools or the like is required the threaded member 21 is caused to rotatably release the inner tube surface 32 from contact with the serrated blocks 24 and thereafter to loosen the tension of screw threaded member 28 sufficiently to permit rotation of the inner tube member 31 to be rotated to the required angle of adjustment and thereafter securing the screw threaded member 28 and the screw threaded member 21 thus again forming a unitary structure of the two tube members 10 and 31.

Figure 3:
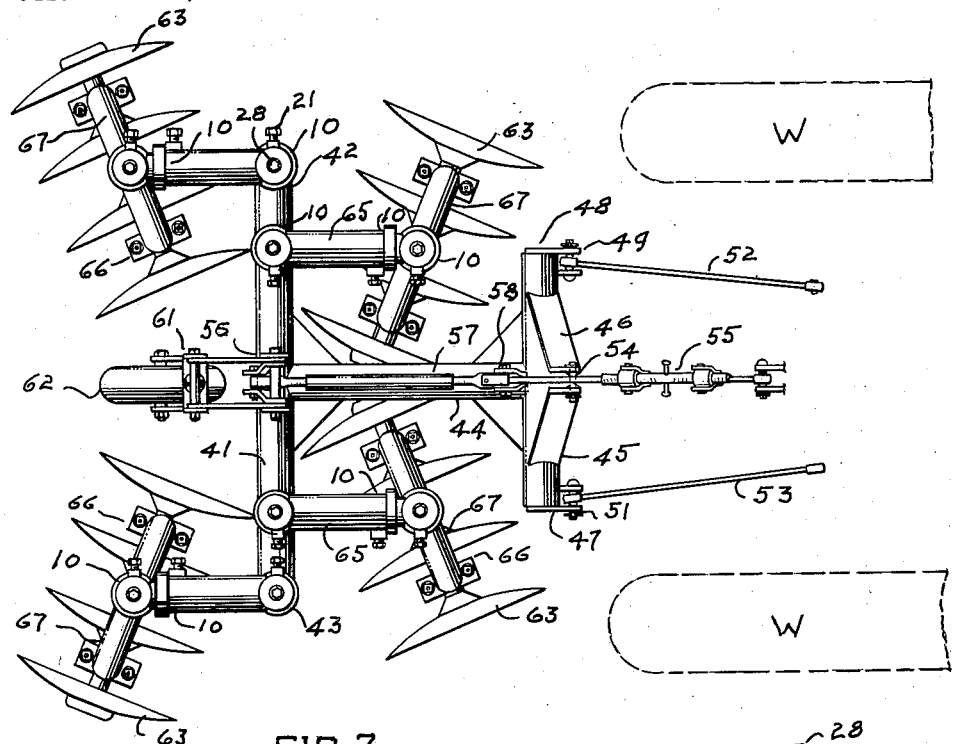
FIGURE 3 is a top plan view illustrating the mounting of the adjustable securing means in combination with a disc harrow.

It should be here noted that the type of structure of the implement carrying frame may be of any desired cross section, however the preferred embodiment is to use round tubular members, especially where a plurality of adjustments are required as best illustrated in FIG. 3 of the drawings which discloses conventional type disc harrow, as an implement of this type requires a plurality of angular adjustments, both in the vertical as well as the horizontal plane.

In FIG. 3 of the drawings the main frame structure comprises a transverse tubular member 41 and intermediate the ends 42 and 43 thereof is positioned an elongated member 44 having the rear end thereof rigidly secured to the said transverse member 41 and the forward end of the said member 44 is rigidly secured to a transverse member 45 which carries an A type or three point hitch, the upstanding portion 46 forming the A of the hitch and the ends 47 and 48 are provided with attaching means 49 and 51 to which the fluid actuated lever arms 52 and 53 are attached.

The open portion 54 of the A section 45 and 46 pivotally carries an arm 55 which is attached to the stub arm (not shown) of the tractor. The letter W indicates the position of the rear or drive wheels of the tractor which is provided with the A or three point hitch mechanism.

An upstanding supporting member 56 is rigidly secured to the transverse member 41 and intermediate the ends 42 and 43 thereof supports leverage means, which includes an adjustable arm 57 pivotally attached at its forward end 58 to the arm 55, the said arm 57 at its rear end is pivoted to the upstanding supporting member 56 and by bell crank means to a caster wheel support frame 61 to which is attached a caster wheel 62.

The leverage mechanism as described briefly above is completely illustrated and described in detail in my pending application Serial Number 158,743.

Figure 2:
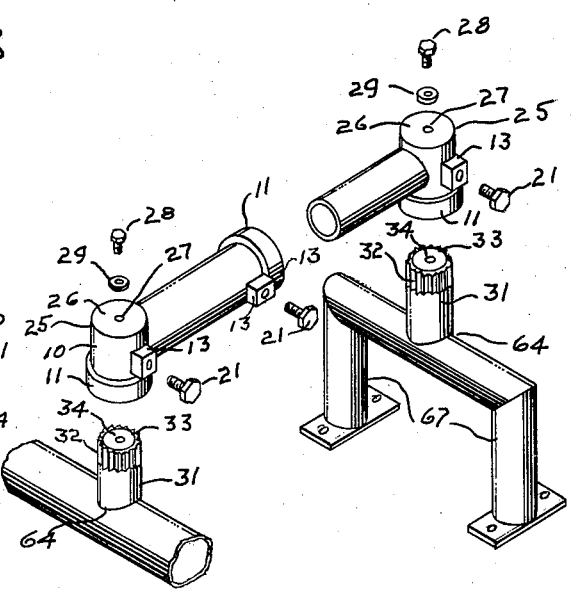
FIGURE 2 is an exploded view of the several parts positioned for assembly.

The disc members 63 are of the conventional type, with this exception, the upstanding inner tube member 31, as best illustrated in FIG. 2 of the drawings is securely welded, brazed or bolted at 64 as desired to the frame structure 67 into which is positioned the outer tube member 10 and provided with a horizontally extended tube member 65 and provided at its opposite end with a similar outer tube member 10 as best illustrated in FIG. 3 of the drawings and described supra.

A similar upstanding inner tube member 31 forming a part of the structure 67 is rigidly secured to the same and in turn to the disc carry member 66 and secured thereto. The inner tube member 31 having its inserting serrated end 32 positioned within outer tube 10 and assembled as above described.

It is to be understood that while the inserting serrated end 32 of the inner tube 31 is shown as having a smooth surface, it is intended where and when needed, such as mounting heavy tools and the like are concerned, the said inserting serrated end 32 may be provided with serrated surface and preferably matching the serrated blocks 24 and the slidable member 14 serrated lower surface 16. A serrated collar or the like may be secured to the said inserting end surface 32 if so desired without departing from the scope of the appended claims.

Figure 4:
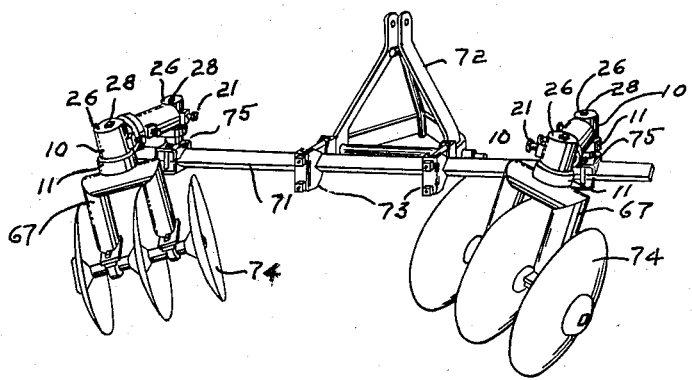
FIGURE 4 illustrates the adjustable securing means in combination with a disc hiller.

FIG. 4 illustrates a disc hiller or the like wherein the discs are caused to be positioned at an angle in two planes, the horizontal and the vertical.

The frame 71 is carried by and rigidly secured to the conventional A type or three point hitch 72 by means of clamps 73 or the like. The discs 74 are carried or supported by the frame structure 67 as illustrated in FIG. 2 of the drawings and assembled as described supra. It should be here noted that the combination of the adjusting means of this invention are so positioned that the discs 74 may be angled in any desired position and rigidly secured in that position.

The adjusting clamp means 75 secured to the frame 71 provides for horizontal movement of the assembled discs and securing means primarily for width adjustment between the earth working tools such as discs 74 or cultivating shovels or the like.

Figure 5:
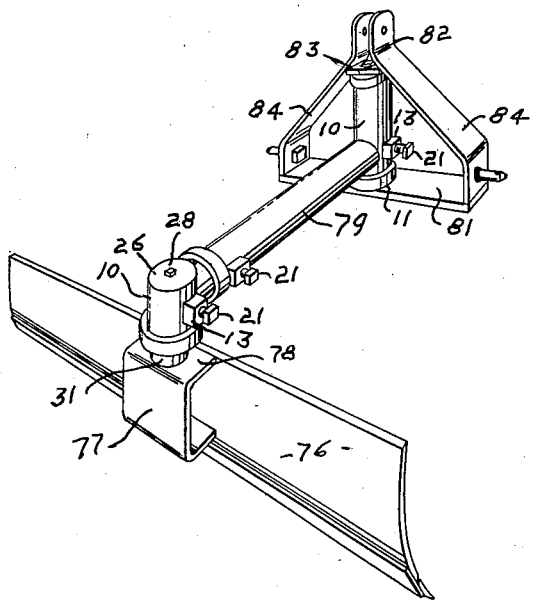
FIGURE 5 illustrates the adjustable securing means in combination with a grader or scraper attached to a three point hitch member and the scraper carrying frame.

FIGURE 5 illustrates the mounting of a scraper blade 76 or the like, such as a blade for leveling and or moving earth, which in its operation requires numerous angular adjustments in order to perform satisfactory work.

As illustrated, the blade 76 preferably centrally positioned intermediate the ends thereof is a securing member 77 formed in U shape, the ends of the U being welded, brazed or bolted to the blade, the inner tube 31 is rigidly secured by any suitable means such as welding to the upper leg 8 of the U member 77 and the outer member 10 is positioned in assembled relation as described supra.

Secured to the side of the outer tube 10 by any suitable means such as welding or the like, the inner tube 31 into which is assembled the outer tube member 10 being formed as an elongated member 79, abutting and secured to an upstanding outer tube member 10 by any suitable securing means. The said upstanding outer member 10 and its inserted end 32 is positioned in assembled form, the said member 31 being rigidly secured to the transverse member 81 of a conventional A type hitch or three point hitch and the closure 82 by means of plate 83 secured to the arms 84 of the said hitch.

The combination of attachments and adjustments as set forth supra, provides the necessary information as to the extraordinary plurality of uses to which the instant invention is provided to render.

I am aware that numerous and extensive departures may be made from the embodiment herein illustrated and described without departing from the spirit of my invention and set forth in the appended claim.

Having described my invention, I claim:

In an article of manufacture, comprising adjustable securing means, including a tubular member, a plurality of spacer bars secured in spaced apart relation to the inner wall of the said tubular member, a plurality of serrated members secured to the inner wall of the said tubular member, said members being spaced apart and in opposed relation to the said spacer bars, a rectangular member provided with a rectangular aperture therethrough and further provided with an internally threaded cap portion centrally thereof, a portion of the said rectangular member is positioned through the wall of the said tubular member and rigidly secured thereto, a rectangular block slidable within the said rectangular member, the inner end surface of which is serrated, an adjusting screw threaded member positioned in screw threaded relation in the screw threaded cap portion of the rectangular member, the said serrated members positioned in opposed relation to the rectangular member and the spacer bars in opposed relation to the serrated members, a second tubular member positioned in rotatable relation within the first mentioned tubular member and in juncture relation to the said spacer bars and serrated members, the said second tubular member having a sealed end and provided with a screw threaded aperture centrally therethrough, a cap portion sealing the open end of the first mentioned tubular member and having an aperture centrally therethrough, whereby, upon insertion of the second mentioned tubular member into the first mentioned tubular member and upon predetermined rotating adjustment thereof and securing the said second mentioned tubular member in rigid relation with the said serrated members by means of the said adjusting screw threaded member, and securing means to prevent the said second mentioned tubular member from dropping away from the first mentioned tubular member when the said rectangular block is released for adjustment of the inner member to the outer member.

References Cited in the file of this patent
UNITED STATES PATENTS

| | | |
|---|---|---|
| 534,092 | Biddle | Feb. 12, 1895 |
| 2,986,417 | Baker | May 30, 1961 |
| 3,012,825 | Bullins | Dec. 12, 1961 |

FOREIGN PATENTS

| | | |
|---|---|---|
| 503,797 | Belgium | June 30, 1951 |
| 342,144 | Switzerland | Dec. 15, 1959 |